(No Model.)
J. SNYDER & F. LOCKWOOD.
CULINARY VESSEL.
No. 485,993. Patented Nov. 8, 1892.
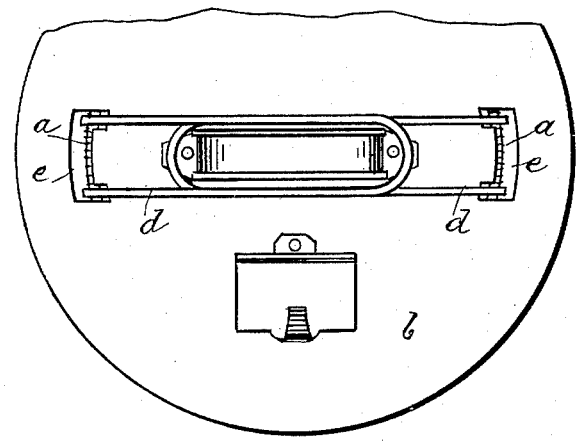
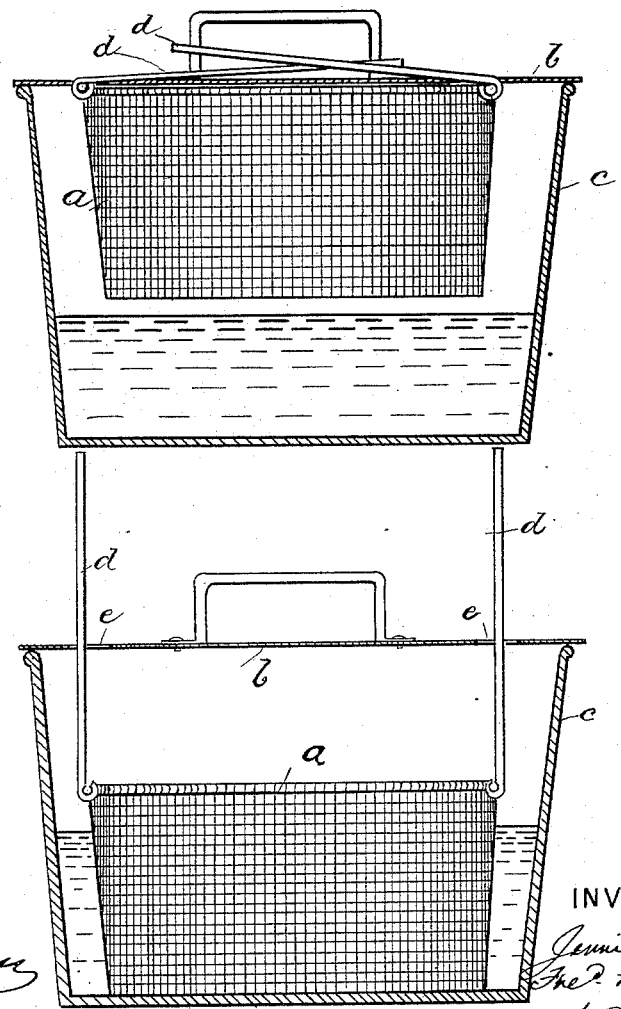
WITNESSES.
INVENTORS:

UNITED STATES PATENT OFFICE.

JENNIE SNYDER AND FRED. LOCKWOOD, OF MIANUS, CONNECTICUT.

CULINARY VESSEL.

SPECIFICATION forming part of Letters Patent No. 485,993, dated November 8, 1892.

Application filed November 23, 1891. Serial No. 412,879. (No model.)

*To all whom it may concern:*

Be it known that we, JENNIE SNYDER and FRED. LOCKWOOD, citizens of the United States, and residents of Mianus, in the county of Fairfield and State of Connecticut, have invented certain new and useful Improvements in Culinary Vessels, of which the following is a specification.

Our invention consists in a steaming-vessel and cover combined in an improved adjustable arrangement enabling the steamer to be used in the ordinary way in a pot for steaming purposes, and also to be immersed in the water contained in the pot for a crib to remove and drain the boiled articles dry, its cover forming the cover of the pot in both cases, all as hereinafter fully described, reference being made to the accompanying drawings, in which—

Figure 1 is a side elevation of our improved vessel in the conditions for steaming purposes and section of the pot in which it is used. Fig. 2 is a plan view of the same, and Fig. 3 is a side elevation of the vessel in the condition for use as a crib and section of the pot.

In this example we represent a wire steaming-pan *a*; but it may be of perforated tin or other approved construction, with a tin or sheet-iron cover *b*, said cover being larger than the steaming-pan to form the cover of the pot *c*, also, said pan and cover being so connected with our improved devices that the pan will be wholly suspended in the pot by the cover and may thus be suspended in a pot of any size larger than the pan, and the connection of the pan and cover is such that with the cover resting on the top of the pot the pan may be let down onto the bottom of the pot to immerse the contents for boiling and may be lifted out and removed, together with the cover, to remove the cooked contents from the water and drain them.

The improved devices of our invention consist of the wire yokes *d*, pivoted to the rim of the pan at opposite sides and inserted through slots *e* of the cover, permitting the cover to be placed on the pan with said yokes extending above it, and either lying on the top of the cover to hold it and the pan in close connection for suspending the pan above the water for a steamer, as in Figs. 1 and 2, or extending directly upward through said slots for handles by which to let the pan down into the water while the cover remains on the pot for boiling and to lift the pan out again. When the cover rests on the pan and the yoke-handles are folded down one over the other on the cover, as shown in Figs. 1 and 2, they fasten the pan and cover suitably for suspending the pan from the cover, without other fastening, the leverage of the handles overbalancing the weight of the pan.

The handles may be rigidly fixed to the pan in the upright position with any kind of latch, pin, hook, or other device to fasten the handles and the cover to suspend the pan from the cover; but it is preferred to pivot them to the pan, because they can be used to better advantage to dump the pan, the joints permitting them to be swung outward by the operator as the pan turns over, and thus form laterally-projecting handles more serviceable for that purpose than if rigidly connected in upward projection.

We claim—

The combination of the steaming-pan, the cover larger than the pan, and handles jointed to the top of the pan and extending through the cover and adapted to fold down on the cover and secure it to the top of the pan, substantially as described.

Signed at Coscob, in the county of Fairfield and State of Connecticut, this 20th day of June, A. D. 1891.

JENNIE SNYDER.
FRED. LOCKWOOD.

Witnesses to the signature of Jennie Snyder:
FLORENCE C. FERRIS,
JENNIE HUGHES.

Witnesses to the signature of Fred. Lockwood:
W. J. MORGAN,
W. B. EARLL.